2,867,617

BIS-ARYLTRIAZOLE OPTICAL BLEACHES

Norman L. Anderson, Hamburg, N. Y., assignor to Allied Chemical Corporation, New York, N. Y., a corporation of New York No Drawing. Application March 23, 1956
Serial No. 573,329

14 Claims. (Cl. 260—240)

This invention relates to bis-aryltriazole compounds. It relates more particularly to new bis-aryltriazole compounds which are substantially white in appearance when viewed in white light lacking ultra-violet radiation, and are excited by ultra-violet radiation to show a high degree of bluish-green to bluish-violet fluorescence.

The primary object of the invention is to provide a new group of chemical compounds of said class having a combination of properties which render said compounds especially useful as so-called "optical bleaches" or whitening and brightening agents particularly in the laundering of cellulosic materials, such as cotton, linen, regenerated cellulose, etc.

Other objects will in part be obvious and in part will appear hereinafter.

A number of chemical compounds are known which, although they are of diverse chemical structure, have the property of giving off a blue fluorescence when exposed to ultra-violet rays, such as daylight or light rich in ultra-violet. Some of them are sufficiently soluble in water and sufficiently resistant to the alkaline action of soap to be capable of use as additives for soaps and other compositions used in laundering clothes and linens, whereby they impart a bluish fluorescence to the laundered goods which has the effect of whitening the appearance of white goods and brightening the appearance of colored goods. Certain of said compounds are substantive to cellulosic fibers, that is, they are taken up from their solutions and held by cellulosic fibers, similarly to direct cotton dyestuffs.

Few of them, however, possess a combination of these and other properties in the desired balance to be useful commercially for the addition to soaps, laundering compositions, detergents, wetting agents, and the like. Thus, while some possess certain of the desired properties they are unstable in aqueous solution against the destructive action of the chemical bleaching agents commonly employed, such as alkali metal hypochlorites, alkali earth metal hypochlorites, alkali metal perborate, hydrogen peroxide, and the like.

According to the present invention, a new group of chemical compounds is provided having such a combination of the said desired properties as to make them especially suitable for use as "optical bleaches" and for other purposes. The compounds of the present invention are chromophore-free bis-aryltriazoles having 1 to 6 sulfo groups in the molecule in which two nitrogen atoms of each aryltriazole radical are linked to a pair of adjacent nuclear carbon atoms of the aryltriazole radical and each aryltriazole radical is linked thru its external nitrogen atom (the other nitrogen atom) to a nuclear carbon atom of a different one of a pair of mononuclear aroyl radicals which are N,N'-substituents of a phenylenediamine radical or a stilbenediamine radical. (As employed herein, the term "sulfo" denotes generically the compounds in the form of their free sulfonic acids and in the form of their metal, ammonium and organic base salts.)

They include compounds in which the aryltriazole radicals are like or different mononuclear or polynuclear (including condensed polynuclear) aryl radicals in which one or more of the nuclear hydrogen atoms are replaced by sulfo groups or other atoms or simple radicals which do not impart color to the molecule; such as halogen (e. g., chlorine or bromine), amino, acylamido, carboxy, alkyl and alkoxy, especially containing up to 5 carbon atoms (e. g., methyl, ethyl, propyl, butyl, methoxy, ethoxy, propoxy, butoxy, and amoxy).

The mononuclear aroyl radicals include benzoyl radicals and substituted benzoyl radicals in which the hydrogen atoms of the nucleus are replaced by another atom or a simple radical which does not impart color to the molecule; such as those referred to above. Thus they include radicals of

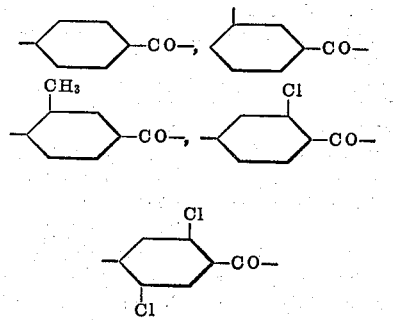

and

The stilbenediamine and phenylenediamine radicals include diamines in which the amino substituents are in various positions, derivatives in which the hydrogen atoms of the nuclei are replaced by other atoms or simple radicals which do not impart color to the molecule, such as those referred to above, and especially sulfo groups. Thus they include the radicals of 4,4'-stilbenediamine
4,4'-diaminostilbene-2,2'-disulfonic acid
p-Phenylenediamine
m-Phenylenediamine, and
p-Phenylenediamine-o-sulfonic acid.

Those which are derived from 4,4'-diaminostilbene-2,2'-disulfonic acid are of particular value in view of their good solubility in water, affinity for cellulosic fibers, fluorescence in ultra-violet light, and fastness properties, particularly fastness to washing and bleaching, especially with hypochlorites and peroxides.

Such compounds, in the form of the free sulfonic acids, are represented by the formula

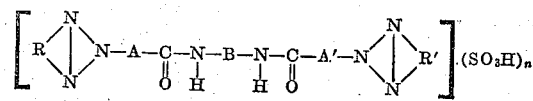

wherein:

R and R' are like or different mononuclear aryl (i. e. of the benzene series), or polynuclear aryl, including condensed polynuclear aryl (especially of the naphthalene series), radicals which are bound by two adjacent nuclear carbon atoms (ortho-carbon atoms) to two nitrogen atoms of the triazole radical, A and A' are like or different phenylene radicals, B is a phenylene or stilbene radical, R, R', A, A' and B are free from further substituents or may be substituted by one or more halogen atoms and/or alkyl, alkoxy, amino, acylamido carboxy and/or sulfo groups, and $n$ is a whole number from 1 to 6, inclusive.

I have discovered that the compounds of the above class possess a combination of desirable properties which render them especially useful as members of the family of "optical bleaches." Thus, they are slightly colored substances which per se and in solutions or on fibers or substrates produce a blue-green to blue-violet fluorescence (between 4000 and 4950 Angstrom units) to a high degree under the influence of ultra-violet radiation, e. g. between 2260 and 4045 Angstrom units. They are sufficiently substantive to cellulosic materials to impart to such materials the property of emanating a bluish fluorescence when excited by ultra-violet radiation; so that they are therefore valuable "optical bleaches", particularly useful in laundering compositions and processes, and adapted to enhance the "whiteness" as well as brilliancy of colors of household cellulosic materials, such as towels, tablecloths, napkins, sheets, pillow cases, shirts and the like. Yet they do not cause an undesirable accumulation of substantive deposits or decomposition products in or on such materials leading to staining of the materials when such cellulose fabrics are laundered repeatedly in solutions which contain a compound of the present invention at a concentration normally used in such washings.

A surprising property of all of the compounds of this invention is their unexpected stability towards the bleaching or oxidizing action of the bleaching agents commonly used in ordinary commercial and household laundering processes applied to household linens and cellulosic white and colored goods, such as alkali metal hypochlorite, alkaline earth metal hypochlorite, alkali metal perborate, hydrogen peroxide and the like, when used at the usual concentrations applied in such processes. I have found that the degree of fluorescence imparted to cellulosic material by treatment with a solution of a compound of the invention is not substantially altered by treatment with such bleaches.

In the form of their alkali metal, ammonium, alkylamine and alkylolamine salts, the compounds of the present invention are soluble to a limited extent in water to form solutions which are compatible with the usual detergents and wetting agents normally used in commercial and household laundering. They lend themselves readily to uniform incorporation into commercial laundering compositions in the form of cakes, powders and solutions, containing cleaning agents such as soaps, ionic detergents (such as, alkylaryl sulfonates and alkyl sulfates) and non-ionic detergents (such as the polymerization products derived from ethylene and propylene oxides).

For general laundering purposes, aqueous solutions which contain up to about 1000 p. p. m. of compound, based on the weight of fabric, are effective to impart distinctive brightening and whitening effects, but usually a concentration ranging from about 10 to about 100 p. p. m. is sufficient for most commercial and household laundry washings.

The bis-aryl triazoles of the present invention can be prepared in various ways. Ordinarily they can be prepared by oxidizing the corresponding ortho amino-azo compounds by means of suitable oxidizing agents similarly to the methods used in manufacturing triazole dyestuffs, e. g., by heating with ammoniacal copper sulfate or with sodium hypochlorite.

The parent ortho-amino-azo compounds can be prepared by coupling one mol of a diazotized aromatic diamine having the formula

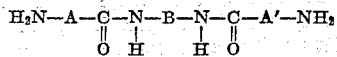

wherein A, A' and B have the meaning set out above, in acid medium, preferably having a pH between about 4.5 and 6, with 2 mols of an aromatic amine, preferably of the benzene and naphthalene series, which has a free position ortho to the amino group and which couples in this position.

Alternatively, they may be prepared by the following sequence of operations wherein A, A', B, R and R' are as defined above:

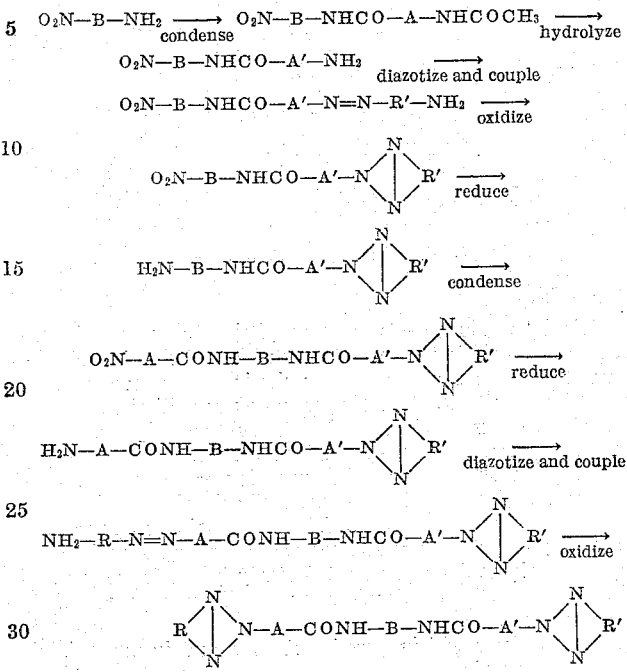

This alternative procedure is particularly suitable for preparing bis-aryltriazole compounds wherein R and R' and/or A and A', as defined above, are unlike radicals.

The invention will be illustrated by the following specific examples, but it is to be understood that the invention is not limited to their details and that changes may be made without departing from its scope. The temperatures are in degrees centigrade and the parts are by weight.

*Example 1*

Part 1.—A solution formed by mixing and stirring 31.9 parts of 4,4'-bis(p-amino-benzamido)-stilbene-2,2'-disulfonic acid, 1 part of sodium carbonate, 1 part of "Tween 20," 400 parts of water, and 7.1 parts of sodium nitrite was added to a slurry of 32.5 parts of 20° Bé. hydrochloric acid and 200 parts of ice. The mixture was stirred for 3 hours to effect tetrazotization of the diamino compound. Thereafter a small amount of sulfamic acid (sufficient to destroy the excess nitrous acid) was added and the tetrazo solution was added with stirring to a cold (0°) slurry of 34 parts of 2-aminonaphthalene-5,7-disulfonic acid, 300 parts of water, 20 parts of 2-naphthalene-sulfonic acid (which serves as a coupling assistant), and sufficient sodium carbonate to make the whole about neutral (pH 6 to 7.5). To the agitated reaction mixture a solution of 30 parts of sodium acetate in 100 parts of water was then added over a period of one hour and thereafter the mixture was stirred for 16 hours to complete the coupling. The disazo compound resulting from the coupling was recovered in the form of a filter-cake by adding 52 parts of common salt (sodium chloride), to precipitate the disazo compound, and filtering. The disazo compound corresponds to the formula

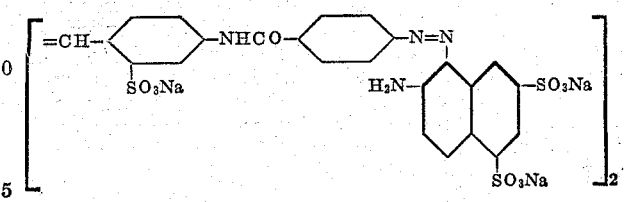

*Part 2.*—The filter cake of disazo compound obtained in part 1 was suspended in 2000 parts of water at 90° and was oxidized to the bis-triazole by adding a solution of 50 parts of copper sulfate pentahydrate and 59.4 parts of 30% ammonia in 200 parts of water to the slurry and refluxing the mixture for 3 hours. The reaction mass was then filtered to remove impurities, and the bis-triazole product was precipitated and recovered by adding 114 parts of sodium chloride to the filtrate, filtering the resulting slurry, and drying the filter-cake.

The dry product was the hexasodium salt having the formula

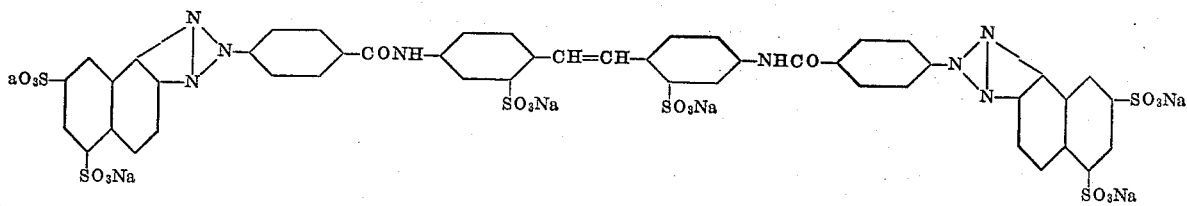

In powdered form it was a grayish-white solid, soluble in water to yield a colorless (water-white) solution. When applied to cellulosic fibers, it imparted a distinct bluish fluorescence thereto under the influence of ultra-violet radiation.

*Example 2*

*Part 1.*—A tetrazo solution, prepared as described in Example 1, part 1, from 31.9 parts of 4,4'-bis(p-aminobenzamido)-stilbene-2,2'-disulfonic acid was added with stirring to a cold (0°) slurry of 26 parts of 2-aminonaphthalene-5-sulfonic acid, 300 parts of water, 20 parts of 2-naphthalenesulfonic acid, and enough sodium carbonate to make the whole about neutral. To the resulting slurry, a solution of 30 parts of sodium acetate in 100 parts of water was added with stirring over a period of one hour, and the mass was then stirred for an additional 16 hours to complete the coupling. The resulting disazo compound was recovered in the form of a filter-cake by adding 52 parts of sodium chloride to the mass, to precipitate the disazo compound, and filtering.

*Part 2.*—The filter cake of disazo compound obtained in part 1 of this example was oxidized to the corresponding bis-triazole compound which was precipitated and recovered in the manner set out in Example 1, part 2.

The dry product was the tetrasodium salt having the formula

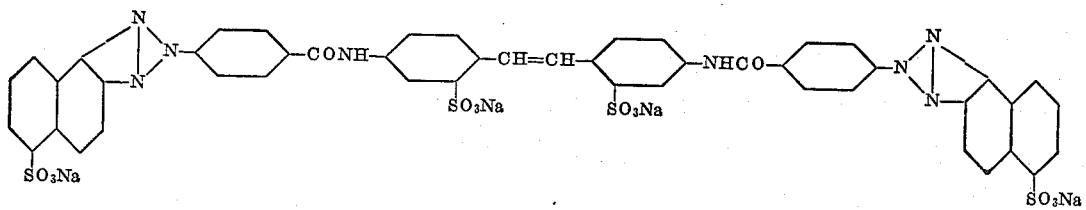

In powdered form it was a tan-colored solid, soluble in water to yield a substantially colorless solution. Cellulosic fibers treated with the aqueous product showed a distinct bluish fluorescence under the influence of ultra-violet radiation.

By employing 1-aminonaphthalene-4-sulfonic acid in place of 2-aminonaphthalene-5-sulfonic acid in the foregoing example, a product possessing similar properties was obtained.

*Example 3*

*Part 1.*—A tetrazo solution, prepared as described in Example 1, part 1, from 31.9 parts of 4,4'-bis(p-aminobenzamido)-stilbene-2,2'-disulfonic acid, was added with stirring to a cold slurry of 27.4 parts of 1-amino-3-methoxy-4-methylbenzene, 20 parts of 20° Bé. hydrochloric acid, 40 parts of water and 20 parts of 2-naphthalenesulfonic acid. Then a solution of 40 parts of sodium acetate in 200 parts of water was added to the coupling mixture, which was agitated at 10° for 16 hours. The disazo compound was then salted out and filtered.

*Part 2.*—The product obtained as a filter cake in part 1 was oxidized to the corresponding bis-triazole compound, and the latter was precipitated and recovered in the manner described in Example 1, part 2.

The dry product was the disodium salt having the formula

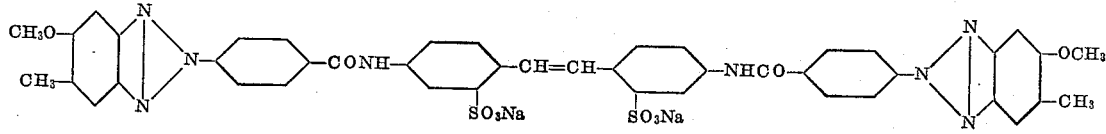

It was a pale tan powder, soluble in water to yield colorless solutions. Cellulosic fibers treated with this product in aqueous solution possessed a bluish fluorescence in ultra-violet light.

*Example 4*

*Part 1.*—17.3 parts of 1,4-bis(p-aminobenzamido)-benzene were dissolved in a mixture of 29 parts of 20° Bé. hydrochloric acid and 150 parts of water at 70°. The solution was cooled to 0° by addition of ice, and a solution of 7.2 parts of sodium nitrite in 20 parts of water was added. The mixture was agitated for about 2 hours to complete the tetrazotization reaction, after which sulfamic acid was added to destroy the excess nitrous acid. The tetrazo solution thus obtained was added to a slurry of 38 parts of 2-aminonaphthalene-5,7-disulfonic acid, 150 parts of water, 10 parts of 2-naphthalene-sulfonic acid (which serves as a coupling assistant) and sufficient sodium hydroxide to make the whole about neutral. To the agitated coupling mixture, a solution of 15 parts of sodium acetate in 100 parts of water was added during 1 hour and thereafter the mixture was stirred for 20 hours to complete the coupling. The mixture was heated to 85°, charged with about 40 parts of sodium chloride, cooled, and filtered.

*Part 2.*—The filter cake of disazo compound obtained in part 1 was slurried in 800 parts of water, heated to 90°, and oxidized to the bis-triazole by adding a solution of 50 parts of copper sulfate pentahydrate and 59.4 parts of 30% ammonia in 200 parts of water and refluxing the mixture for 16 hours. The product was precipitated and recovered by adding 45 parts of sodium chloride, filtering and drying the filter cake.

The dry product had the following formula:

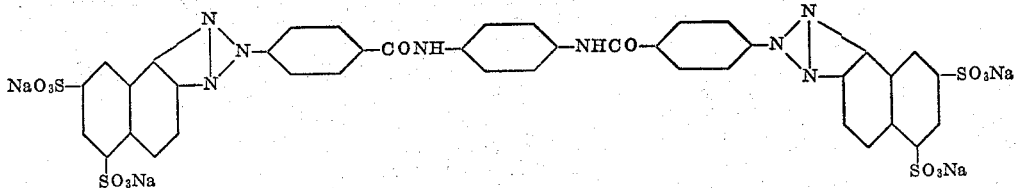

It was a light tan solid, soluble in water to yield colorless solutions. Cellulosic fibers treated with this product in aqueous solution possesed a bluish fluorescence in ultra-violet light.

It will be realized by those skilled in the art that the invention is not limited to the above specific examples and that changes can be made without departing from the scope of the invention.

Thus, in the examples, 2-amino-naphthalene-5,7-disulfonic acid and 2-amino-naphthalene-5-sulfonic acid may be replaced by equivalent quantities of other suitable aromatic-amino compounds as defined above, with due regard in selecting the components that the final product contains in its molecule at least one and not more than six sulfo groups; such as 2-aminonaphthalene, 1-aminonaphthalene-5-sulfonic acid, 1-aminonaphthalene-4,6-disulfonic acid, 1-aminonaphthalene-4,7-disulfonic acid, 1-aminonaphthalene-4,8-disulfonic acid, 1 - aminonaphthalene-3,6-disulfonic acid, m-phenylenediamine, and 2,5-diamino-benzenesulfonic acid.

I claim:

1. A bis-aryl triazole having 1 to 6 sulfo groups and, in the free acid form, corresponding to the formula

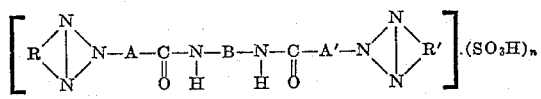

wherein:

R and R' are selected from the group consisting of radicals of benzene and naphthalene and their lower alkyl and lower alkoxy derivatives, which radicals are each bound by two adjacent carbon atoms to two nitrogen atoms of the triazole radical, A and A' are selected from the group consisting of radicals of benzene and its lower alkyl and lower alkoxy derivatives,

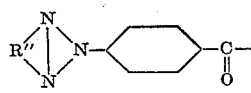

B is selected from the group consisting of the radicals of benzene and stilbene, and n is a whole number from 1 to 6.

2. A bis-aryltriazole in which two nitrogen atoms of each aryltriazole radical are linked to a pair of adjacent nuclear carbon atoms of the aryltriazole radical and each aryltriazole radical is linked through its other nitrogen atoms to a nuclear carbon atom of a different one of a pair of benzoyl radicals which are N,N'-substituents of a diamino-stilbene radical, said bis-aryltriazole having, as sole nuclear substituents, 1 to 6 sulfo groups, zero to 2 lower alkyl groups and zero to 2 lower alkoxy groups.

3. A bis-aryltriazole as defined in claim 2 in which the sulfo groups are in the form of their sodium salts.

4. An N,N'-bis-naphthotriazolebenzoyl-diaminostilbene having 1 to 6 sulfo groups in the molecule as the sole nuclear substituents.

5. N,N'-bis-naphthotriazolebenzoyl-diaminostilbene as defined in claim 4 in which the sulfo groups are in the form of their sodium salts.

6. A bis-naphthotriazole as defined in claim 4 in which each naphthotriazole radical is a 1,2-naphthotriazole radical having a sulfo group at least in the 5-position of the naphthalene nucleus.

7. An N,N' - bis - naphthotriazolebenzoyl-diamino-disulfo-stilbene having 2 to 6 sulfo groups in the molecule as the sole nuclear substituents.

8. A bis-naphthotriazole as defined in claim 7, in which each naphthotriazole radical is the 5,7-disulfo-1,2-naphthotriazole radical.

9. An N,N' - bis - naphthotriazolebenzoyl-4,4'-diamino-2,2'-disulfo-stilbene having 2 to 6 sulfo groups in the molecule as the sole nuclear substituents.

10. A bis-naphthotriazole corresponding to the formula

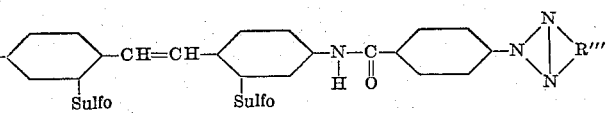

wherein R'' and R''' are 1,2-naphthotriazole radicals having sulfo groups at least in the 5-position of the naphthalene nucleus as the sole nuclear substituents.

11. A bis-naphthotriazole as defined in claim 10, in which the sulfo groups are in the form of their alkali metal salts.

12. A bis-naphthotriazole as defined in claim 11, in which the sulfo groups are in the form of their sodium salts.

13. A bis-aryltriazole corresponding to the formula

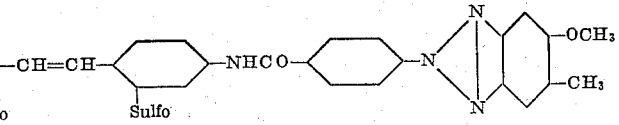

14. An N,N' - bisnaphthotriazolebenzoyl-phenylenediamine having 1 to 6 sulfo groups as the sole nuclear substituents.

References Cited in the file of this patent

UNITED STATES PATENTS 2,141,707   Ebel _____ Dec. 27, 1938

FOREIGN PATENTS 499,494   Canada _____ Jan. 26, 1954